INVENTOR
JOHN F. SCHIPPERS

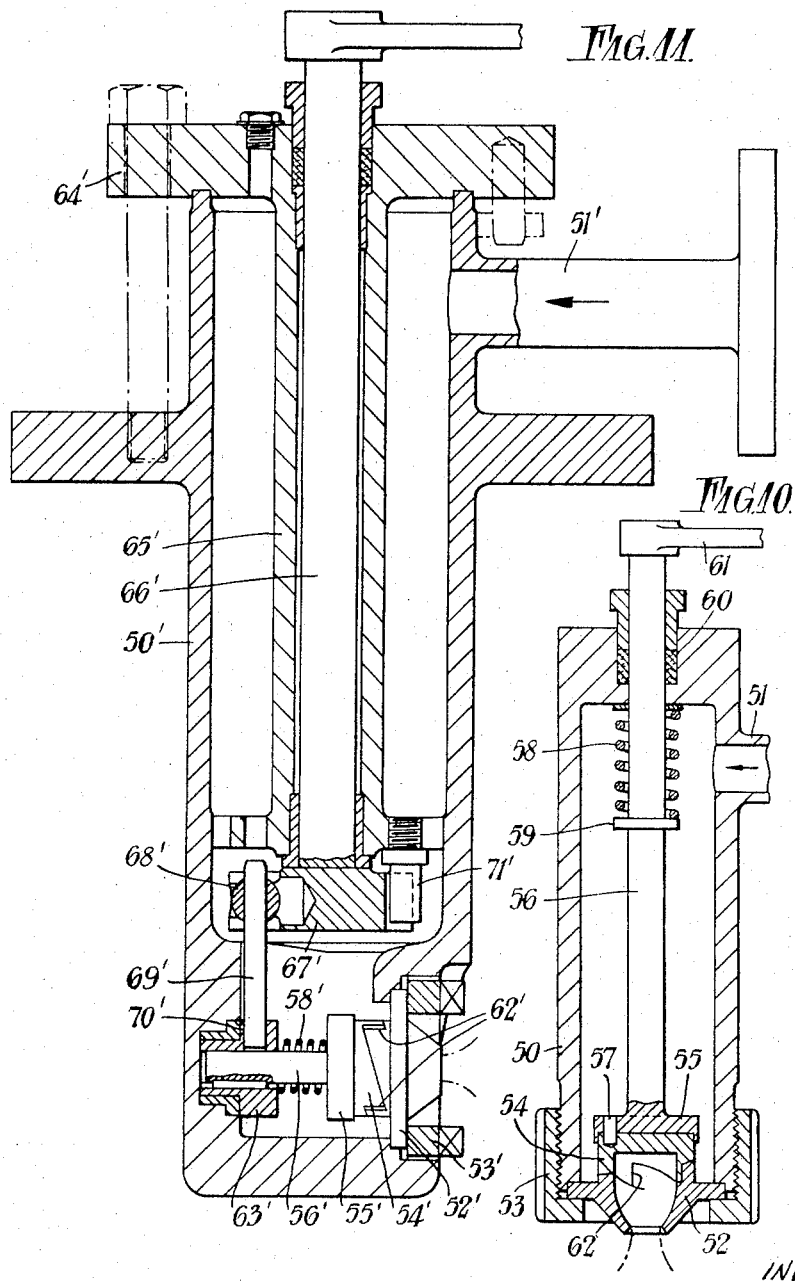

United States Patent Office 2,875,783
Patented Mar. 3, 1959

2,875,783

WHIRLING APPARATUS FOR PRODUCING SPRAYS OF FLUID AND FOR OTHER PURPOSES

Joah Frederick Schippers, Stanmore, England, assignor to James Gordon and Company Limited, Stanmore, England Application March 21, 1957, Serial No. 647,715

Claims priority, application Great Britain March 23, 1956

7 Claims. (Cl. 137—625.3)

Whirling apparatus for producing sprays of fluid, reducing pressure of fluids flowing in pipes, etc., is well known in itself and there have been various proposals for the regulation of the output of such apparatus which should preferably be provided with a substantially tangential inlet and a substantially axial outlet.

In British patent specification No. 555,813 there is described and claimed a whirling apparatus in which the cross-sectional area of the substantially tangential access means to a whirl chamber is varied by variation of the circumferential dimensions thereof, and a typical form of such whirling apparatus is particularly described and illustrated in which the inlet is defined between a fixed and a movable arcuate piece. These pieces are co-planar and between them constitute the circumferential wall of the chamber. In this form of whirling apparatus there are certain difficulties of manufacture and maintenance of efficiency the avoidance of which is the object of the present invention; for example the pressure-tight packing of the pieces, which of necessity operate in a casing, is not easy to attain or maintain under operating conditions (especially where large temperature variations are involved), also a gap equivalent in area to the inlet is of necessity formed in the chamber wall which must be traversed by the whirling fluid.

According to the present invention a whirling apparatus of the general kind referred to has a cylindrical whirl chamber which is comprised by a pair of relatively rotatable members which mate upon complementary surfaces lying transversely to the axis of the chamber, each of said surfaces being bounded by a pair of spiral parallel lines lying at spaced radial distances from the axis of the chamber and by the edges of a substantially plane surface tangential to the circumferential wall of the chamber forming a wall of an adjustable tangential inlet to the chamber.

From another aspect the invention provides a whirling apparatus having a cylindrical whirl chamber comprised by an aligned pair of axially bored mutually rotatable parts which mate upon complementary surfaces transverse to the axis of the chamber, each surface being generated by an edge of a plane tangential to the wall of the chamber moved around the part in a spiral path and the planes whose edges form the lines of generation of the complementary surfaces constituting the side walls of an adjustable tangential inlet to the whirl chamber.

The complementary surface of the parts may lie at right angles to the axis of the whirl chamber, in which case the inlet will direct fluid in a straight path around the wall of the chamber, or the complementary surfaces may be inclined to the axis of the chamber so that an axial component will be given to the entering fluid.

The two parts of the chamber may be pressed together by an axial load applied for example by a spring, and one of the parts may normally be maintained stationary while the other part is angularly adjustable by manually operated means.

A single whirling apparatus may have a chamber comprised by several aligned pairs of parts, so that it may have several distinct inlets spaced along its length.

Alternatively, one pair of parts may form a chamber having several tangential inlets spaced around its circumference the planes of generation of the mating surfaces being spaced like the generators of multi-start threads.

The parts may be maintained in alignment by a suitably apertured surrounding casing of cylindrical form, but it is envisaged that where the mating surface of the parts are inclined to the axis of the chamber no external alignment aid will be necessary since the parts are self aligning under axial load.

In any case, pressure fluid surrounding the whirl chamber is admitted through the tangential inlet port or ports and is discharged axially at one or both ends of the chamber.

The principle of the invention is illustrated in the drawings of parts which can be mutually assembled to form alternative types of whirl chamber and of alternative forms of spraying apparatus embodying such chambers.

In the drawings:

Fig. 10 is a vertical section through a sprayer having an axial discharge;

Fig. 11 is a vertical section through a sprayer having a radial discharge;

Figure 1:
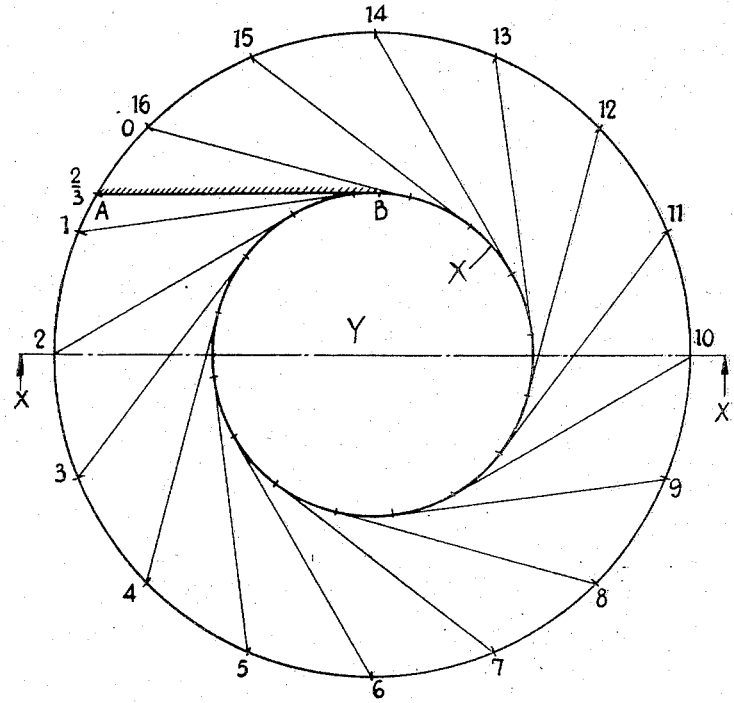
Fig. 1 is a plan view of one of a pair of parts which together form a whirl chamber.

Referring to the drawings, Fig. 1 shows a plan view of what may be termed, for the sake of convenience, the lower part of a pair of parts which together constitute a whirl chamber.

The line AB on Fig. 1 is a tangent to the smaller of the concentric circles. This circle represents the wall X of a cylindrical chamber Y. This line AB, which is the base of a plane face AA′B′B (Figs. 2 and 3) is the generator of a spirally ascending flat surface which curves through 360° to terminate in the line A′B′. Sixteen other tangential lines numbered consecutively have been shown on Fig. 1 to enable levels to be picked up on the side elevation of Fig. 2 and the section of Fig. 3.

Figure 4:
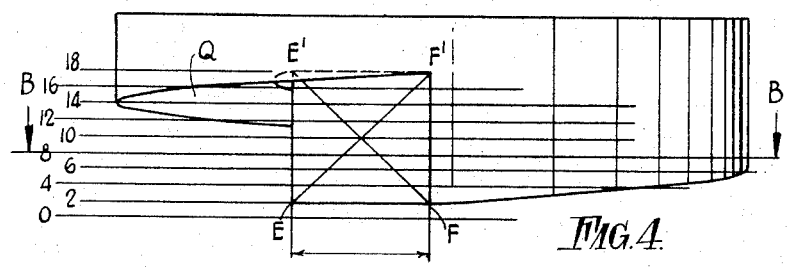
Fig. 4 is a side elevation of the upper part of a whirl chamber.
Figure 5:
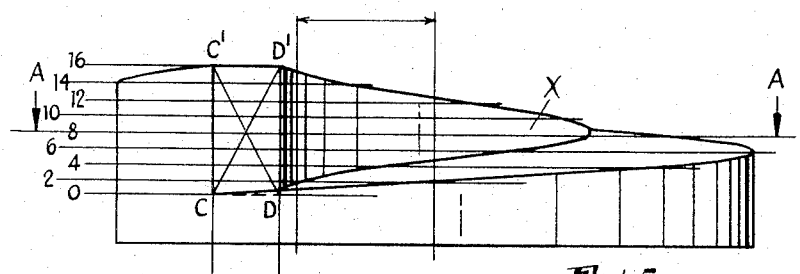
Fig. 5 is a side elevation of the lower part of a whirl chamber.
Figure 6:
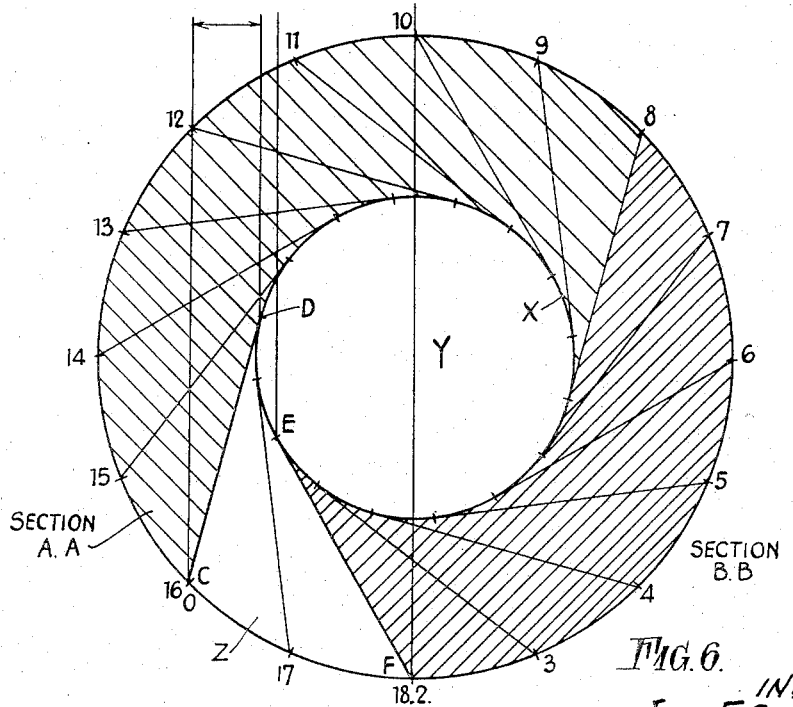
Fig. 6 is a horizontal section of the line B—B of Fig. 4 superimposed upon a horizontal section on the line A—A of Fig. 5.

Figs. 4, 5 and 6 show the upper and lower parts of a whirl chamber and superimposed cross sections of the two parts respectively.

Figure 3:
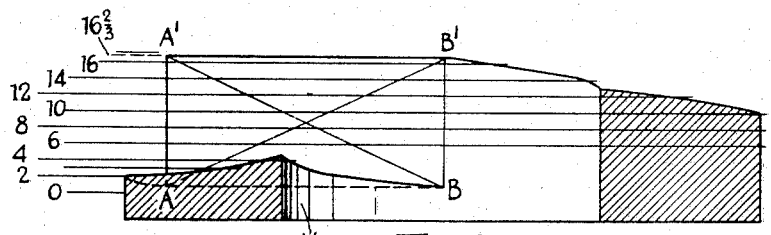
Fig. 3 is a vertical section on the line X—X of Fig. 1.
Figure 2:
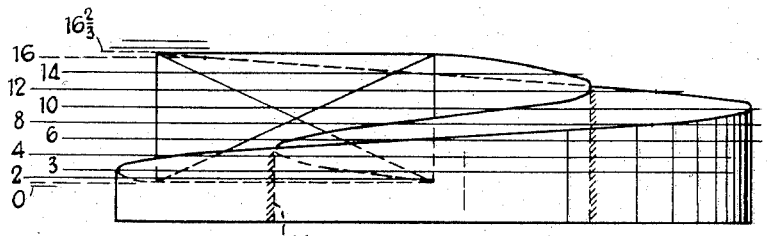
Fig. 2 is a side elevation of the part shown in Fig. 1.

The lower part shown in Fig. 5 is essentially the same as that shown in Figs. 1, 2 and 3 but with the plane face designated CC'D'D, whereas the upper part shown in Fig. 4 is a complementary part whose spiral mating surface Q is generated by the tangential line E'F' which constitutes the base of the plane face E'EFF'.

Fig. 6 shows how a tangential inlet passage Z to the central whirl chamber Y is formed between the plane faces of the mated upper and lower parts. The cross-sectional area of this passage Z is infinitely variable between nothing and a maximum by rotating the upper and lower parts relatively to one another about the axis of the chamber.

The consecutively numbered tangential lines on Fig. 6 again enable levels to be picked up on Figs. 4 and 5.

Figure 7:
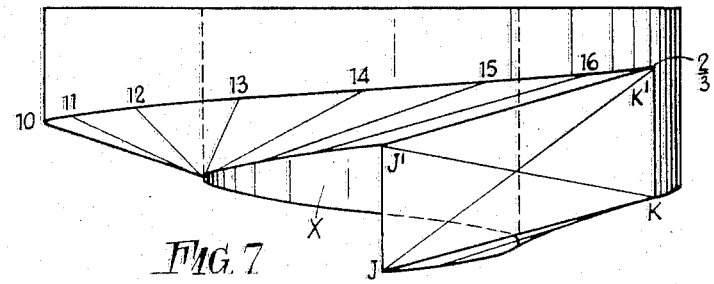
Fig. 7 is a side elevation of the upper part of an alternative form of whirl chamber.
Figure 8:
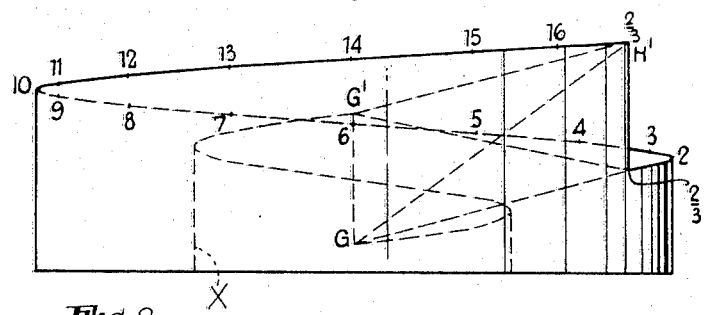
Fig. 8 is a side elevation of the complementary part to that shown in Fig. 7.
Figure 9:
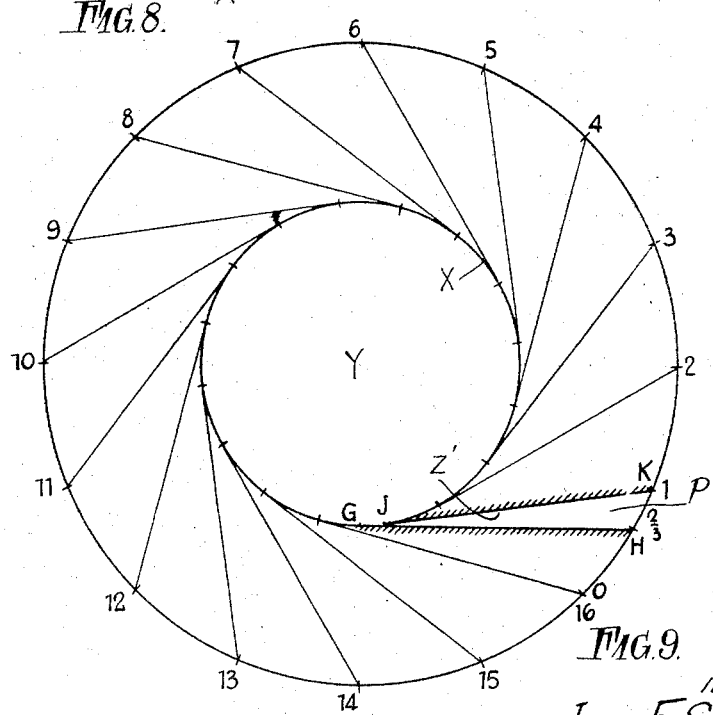
Fig. 9 is a plan view of the part shown in Fig. 8 showing the location of a tangential inlet passage formed on the mating of the part shown in Fig. 7 therewith.

The alternative form of whirl chamber shown in Figs. 7, 8, and 9 is generally similar and the same system of consecutively numbered tangential lines has been employed.

In this case the generating lines J'K' of the upper part in Fig. 7 and GH of the lower part in Fig. 8 are sloped downwardly, so that the mating surfaces of the two parts are "coned" and the tangential inlet passage Z' defined between the faces GG'H'H and J'JK'K has sloping top and bottom walls, of which the bottom wall P is shown in Fig. 9, which impart an axial component to fluid admitted between them.

The line JK has been superimposed on the plan view of the lower part in Fig. 9 in order to show the inlet passage in a near closed condition.

It will be appreciated that the central chambers Y of either of the forms illustrated are perfectly smooth and that the two parts of either form can be urged together axially to any desired extent so as to prevent leakage between their mated surfaces.

Examples of the practical application of the invention are given in the later numbered drawings.

In Fig. 10 is shown a spray for liquid which has a cylindrical body 50 to which liquid is supplied under pressure through the inlet branch 51.

The lower part 52 of a whirl chamber is held locked against the body 50 by a cap nut 53, while the upper part 54 of the chamber is engaged by a dished flange 55 at the end of an adjusting spindle 56.

A pin 57 enables the part 54 to be rotated relative to the part 52 on rotation of the spindle.

A spring 58 acting upon a collar 59 on the spindle applies an axial force between the two parts of the chamber.

The spindle passes through a gland 60 at the head of the sprayer body and is provided with a handle 61.

The inlet 62 to the chamber is shown completely shut-off, but it will be clear that an anti-clockwise (as viewed from above) movement of the handle 61 will open the inlet to a desired degree.

In Fig. 11 is shown a sprayer for liquid which has a radial outlet. In this figure, primed but otherwise like references to those used in connection with Fig. 10 are used where possible.

The cylindrical body 50' has an inlet 51' for fluid.

The outer part 52' of the whirl chamber (which is shown in full) is locked against the body by a ring nut 53', while the inner part 54' of the chamber is engaged by the dished flange 55' at the end of the spindle 56'.

A compression spring 58', acting between the flange 55' and a sleeve 63' which is keyed to the shaft 56', applies an axial force between the two parts of the chamber.

It will be seen that the chamber is shown as having more than one inlet 62' and that such inlets are shown partially opened.

In order that the sleeve 63' may be rotated to provide adjustment of the inlets 62' the body 50' is fitted with a cover plate member 64' which incorporates a guiding sleeve 65' for an adjusting spindle 66'.

The spindle 66' is formed at its lower end with an arm 67' in which is fitted a vertically bored ball 68'. A rod 69' freely passed through the ball 68' and entering a bore 70' in the circumference of the sleeve 63' transmits a part-rotational movement from the spindle 66' to the shaft 56'. A stop pin 71 prevents excessive movement of the spindle 66'.

Figure 12:
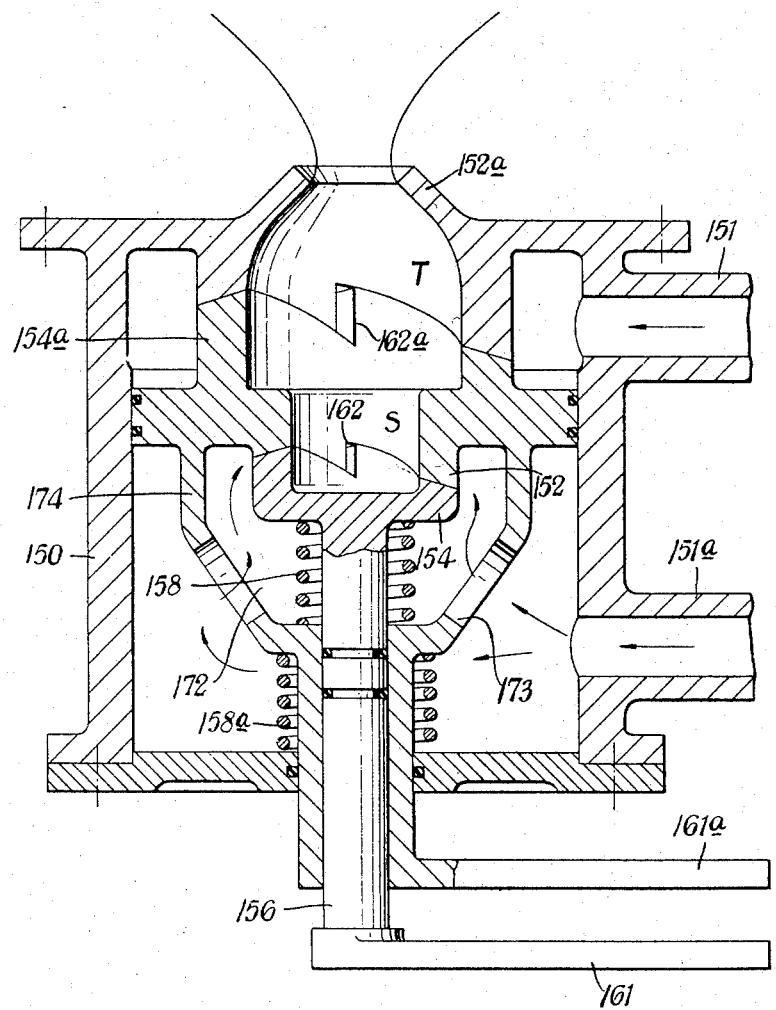
Fig. 12 is a vertical section through a sprayer in which two fluids can be mixed within a whirl chamber with axially spaced inlets.

In Fig. 12 there is shown a duplex whirl chamber having axially spaced inlets through which two different fluids may be supplied for mixing before discharge from a spray outlet. In Fig. 12, the reference characters numbered one hundred higher identify parts corresponding to those in Fig. 10.

In this apparatus the body 150 has two inlets for fluid 151 and 151a.

The whirl chamber has a section S of relatively small diameter and a section T of larger diameter.

The fluid inlet 162 to the section S of the whirl chamber is supplied from an annular chamber 172 through apertures 173 in a composite member 174 which provides the part 152 of the smaller diameter section S and the part 154a of the larger diameter section T.

The fluid inlet 162a to the larger diameter section T of the whirl chamber is supplied from the annular space between composite member 174 and the body 150.

The body 150 is formed at its upper end with the part 152a of the chamber section T.

A spindle 156 is formed at its upper end with the part 154 of the smaller diameter section S.

Springs 158 and 158a apply the necessary axial force between the parts of the whirl chamber to prevent fluid leakage.

A handle 161 enables the opening 162 to be varied as the part 154 is moved relative to the part 152, and a handle 161a attached to the composite member 174 enables the opening 162a to be varied as it moves the part 154a relative to the part 152a.

Suitable adjustment of the handles 161 and 161a gives a desired spray of mixed fluid from the two inlets 151 and 151a.

I claim:

1. A whirling apparatus of the general kind referred to, comprising a hollow body having an inner circumferential wall defining a cylindrical whirl chamber, said body including a pair of body portions separated transversely of said chamber and being relatively rotatable about the axis of said chamber, said body portions having complementary engaging surfaces respectively bounded by a pair of spiral parallel lines lying at spaced radial distances from the axis of the chamber and by the edges of substantially plane surfaces tangential to said circumferential wall and forming the opposed side walls of an adjustable tangential inlet to the chamber.

2. A whirling apparatus comprising a hollow body including a pair of parts each having a cylindrical bore therein, said parts being juxtaposed with their bores in axial alignment and the cylindrical walls thereof jointly forming the circumferential wall of a cylindrical whirl chamber, said parts being relatively rotatable about the axis of said chamber and having engaging complementary surfaces transverse the axis of said chamber, said surfaces including helical portions generated about the axis of said chamber and flat portions between said helical portions and disposed in planes tangential to said circumferential wall, said flat surface portions constituting the opposed side walls of a tangential inlet to the whirl chamber, whereby said inlet may be closed or its size adjusted by relative rotation of said parts.

3. A whirling apparatus as claimed in claim 2 wherein the helical portions of the complementary surfaces of the parts are at right angles to the axis of the chamber.

4. A whirling apparatus as claimed in claim 2 wherein the helical portions of the complementary surfaces of the parts are inclined to the axis of the chamber to impart an axial component to entering fluid.

5. A whirling apparatus according to claim 2 wherein the two parts are urged together by a spring.

6. A whirling apparatus according to claim 2 comprising a plurality of pairs of parts in axial alignment so that more than one inlet is provided at axially spaced positions.

7. A whirling apparatus according to claim 2 wherein said parts have a plurality of sets of said complementary surfaces with each set of said surfaces defining a tangential inlet.

References Cited in the file of this patent

UNITED STATES PATENTS

| | | |
|---|---|---|
| 854,352 | Hobart | May 21, 1907 |
| 1,481,597 | Forster | Jan. 22, 1924 |
| 1,536,982 | Strahan et al. | May 5, 1925 |